United States Patent Office 3,451,817
Patented June 24, 1969

3,451,817
COMBINED FORMALDEHYDE AND BIS-BISUL-
FITE ALDEHYDES AS HARDENERS
Charleton C. Bard and Howard W. Vogt, Rochester,
N.Y., assignors to Eastman Kodak Company, Rochester, N.Y., a corporation of New Jersey
No Drawing. Filed Nov. 1, 1966, Ser. No. 591,142
Int. Cl. G03c 5/30, 1/30
U.S. Cl. 96—66
7 Claims This application relates to prehardening hydrophilic colloid layers and photographic elements and more particularly to compositions for prehardening photographic emulsion coatings during photographic processing.

It is known to use formaldehyde either alone or with succinaldehyde as prehardening agent(s) in aqueous solutions for prehardening the hydrophilic colloid layers in photographic materials during processing operations. Baden and Bard U.S. Patent 3,220,849 describes the use of formaldehyde together with succinaldehyde as the hardening agents in a prehardener solution. Formaldehyde has been considered useful in prehardening gelatin and silver halide emulsion layers but high concentrations of formaldehyde, such as on the order of about 55 grams per liter of the prehardener solution, have ordinarily been necessary to adequately harden gelating during some photographic processing operations. The use of formaldehyde and other aldehyde hardeners such as succinaldehyde in the high concentrations required has offered various disadvantages including irritation of the eyes and respiratory system of the processing operators. Formaldehyde often exhibits undesirable photographic properties as over hardening the surface which tends to result in reticulation problems. Use of succinaldehyde bis-bisulfite adducts in alkaline prehardener solutions is described by Allen et al. in U.S. Patent 3,232,761, however, at pH's of 7 and below 7, succinaldehyde bis-bisulfite adducts are so very slightly disassociated that they are ineffective as hardening agents.

The purification of dialdehydes such as, for example, succinaldehyde suitable for use in prehardener solutions for color photography is expensive and as a result it has been the practice to add either 2,5-dimethoxytetrahydrofuran or 2,5-diethoxytetrahydrofuran to strongly acidified water and allow about one hour for these compounds to hydrolyze forming the required succinaldehyde then the other necessary chemicals are added to adjust and buffer the pH and complete the prehardener solution. Not only is the hydrolysis time undesired since it interrupts the mixing operation and ties up the mixing tank facilities but these tetrahydrofuran derivatives are liquids and have to be individually packaged from other components of the prehardener compositions used for making prehardener solutions.

It is therefore an object of our invention to provide a novel composition for preparing prehardener solutions having pH's of 7 and below which avoid the need for using 2,5-dimethoxy or 2,5-diethoxytetrahydrofuran.

It is another object of our invention to provide a novel composition for preparing prehardener solutions with pH's of 7 and lower which are less expensive to package, require less time for the preparation of a prehardener solution, and when in solution have a substantially reduced odor of dialdehydes, such as, succinaldehyde.

It is another object of our invention to provide a novel composition for preparing prehardener solutions which are substantially freer from dirt formation during use than prior art prehardener solutions.

These and other objects will become apparent in the following specification and claims.

These and other objects are accomplished according to our invention by the preparation and use of aqueous compositions having a pH in the range from about 2 to about 7 and comprising formaldehyde and a bis-bisulfite adduct of a dialdehyde in which the aldehyde groups are separated by a linear chain of 2 to 3 carbon atoms which chain has no more than 3 substituents thereon other than hydrogen, said substituents being alkyl and/or alkoxy of from 1 to 4 carbon atoms. Included among the dialdehyde bis-bisulfite adducts used to advantage according to our invention are the bis-bisulfite adducts of the following dialdehydes: $\beta$-methyl glutaraldehyde, glutaraldehyde, $\alpha$-methyl glutaraldehyde, maleic dialdehyde, succinaldehyde, cyclopentanedicarboxaldehyde, methoxy succinaldehyde, $\alpha,\alpha$-dimethyl glutaraldehyde, $\alpha,\beta$-dimethyl glutaraldehyde, methyl succinaldehyde, $\alpha$-methyl-$\beta$-ethoxy glutaraldehyde, $\alpha$-butoxy glutaraldehyde, $\beta$-isopropoxy succinaldehyde, butyl maleic dialdehyde, etc.

The bis-bisulfite derivatives may be those of alkali metal bisulfites, nitrogen base (ammonium, amines, and the like) bisulfite, etc.

Our compositions are used to advantage for the preparation of solutions in the pH range from about 2 to about 7 for prehardening hydrophilic colloid layers such as gelantino silver halide layer(s) in photographic elements especially during the photographic processing steps used in color photography. Use of our compositions results in significant reductions in the objectionable pungent odor of dialdehyde such as succinaldehyde which is characteristic of prehardener solutions prepared from the dialdehyde per se or dialdehyde precursor such as 2,5-dimethoxytetrahydrofuran. Our prehardener solutions form less dirt during use than do the corresponding dialdehyde-formaldehyde prehardener. Prehardener solutions are advantageously prepared from our composition in about 10 minutes as compared to the hour which is normally required for preparing prior art succinaldehyde prehardener solutions in which 2,5-dimethoxy and/or 2,5-diethoxytetrahydrofuran is used as the precursor for succinaldehyde. It is readily apparent that use of our prehardener compositions provide substantial technical advances.

Our aqueous prehardener compositions advantageously contain formaldehyde in a concentration range of from about 2 to about 56 grams per liter and a dialdehyde bisulfite adduct in a concentration range of from about 1 to about 100 grams per liter.

Our compositions also advantageously contain an alkali metal sulfate, e.g., sodium sulfate, potassium sulfate, or lithium sulfate, and acids such as acetic acid, sulfuric acid, phosphorous acid, phosphoric acid, etc., and an alkali metal salt of one of these acids to serve in a buffering capacity to hold the pH in the desired range from about 2 to about 7. A particularly advantageous form of acid buffer is a mixture of solid alkali metal diacetates combined with alkali metal acetates. In addition to the above, any other of the addenda normally used in prehardener solutions can be used to advantage in our compositions. These include materials such as an alkali metal bromide, and an inhibitor, such as, dioxane, acetyl acetone, the $C_{16}$–$C_{15}$ aliphatic alcohols, the aromatic sulfonic acids, kojic acid, the amino aliphatic acid of 2 to 4 carbon atoms, etc. Generaly these inhibitors are used to advantage so that they form in solution from 0.1 to 20 grams per liter of the prehardener solutions. In the case of the aliphatic alcohols, lower proportions have been found to be effective. For instance, concentrations of octyl alcohol down to as low as 0.01 ml./l. have been found useful. In many cases useful proportions of the inhibitors have been limited to correspond to the water colubility of the material used.

The prehardening step in color processing is used in order to control the amount of swelling of the hydrophilic colloid layers of the multilayer photographic elements during the processing operation. Usually if no prehardening step were used, the emulsion layers would swell excessively and would quickly strip off of the film support in the high pH developer solutions. The prehardening step is generally designed in order to control the amount of swell of the emulsion layers from the dry thickness to the range of from about 100% to about 300% as measured at the end of the negative development step. The desired percent swell will depend upon a number of factors including the photographic emulsion and the temperature of the processing solutions. For certain of the multilayer multicolor photographic materials being processed at 100° F., a 200% swell by the end of the negative development is preferred as an ideal condition.

The percent swell is conveniently measured by an instrument for continuously measuring the swell of gelatin in photographic film coatings which is described by F. N. Flynn and H. A. Lavine in "Photographic Science and Engineering," volume 8, page 275 (1964). This instrument hereinafter will be referred to as "swelling meter."

Our invention will be further illustrated by the following typical examples.

EXAMPLE 1

An aqueous composition was prepared by dissolving 6.5 grams of succinaldehyde bis-sodium bisulfite and 27 ml. of 37.5% formaldehyde in 500 ml. of water. To this composition was added 75 grams of sodium sulfate, 2 grams of sodium bromide, 7.8 grams of sodium diacetate, 15 grams of sodium acetate and water to bring the volume to 1 liter. This prehardener solution had a pH of 4.8.

A multilayer color photographic film containing incorporated couplers was exposed to a color image and processed at 100° F. by contacting for 2 minutes 35 seconds with the prehardener solution described above, followed by contacting with a neutralizer solution for 35 seconds, contacting with a negative developer solution for 3 minutes and 20 seconds. The emulsion was found to have swollen to the desired thickness that was 200% of the dry emulsion thickness as measured by the "swell meter" described above.

The neutralizer solution was a conventional neutralizer solution with a salt content of about 70 grams per liter an aldehyde scavenger and a buffer system to hold the pH at 4.8. A conventional negative developer with hydroquinone developing agent and a pH of 9.9 was used.

EXAMPLE 2

Example 1 was repeated using series of prehardener solutions adjusted to a pH of 7 and containing succinaldehyde bis-sodium bisulfite concentrations of 0, 6.25, 12.5, 25, 50 and 100 grams per liter at each of the following formaldehyde concentrations 0, 4.7, 9.4, and 18.8 grams per liter. The amount of hardening was judged based on the percent swell values measured as in Example 1. The results showed that succinaldehyde bis-sodium bisulfite produced no hardening in the absence of formaldehyde. In the absence of succinaldehyde bis-sodium bisulfite, concentrations of formaldehyde as high as 18.8 grams per liter gave inadequate hardening. It was therefore unexpected that concentrations of formaldehyde as low as 4.7 grams per liter with an estimated amount of from about 8 grams per liter to 50 grams per liter of succinaldehyde bis-sodium bisulfite would produce the desired amount of hardening or more hardening than is desired for the immediate film produced under the processing conditions used. The results also showed that the formaldehyde concentrations of 9.4 grams per liter and 18.8 grams per liter with from 6.25 to 100 grams of succinaldehyde bis-sodium bisulfite per liter produced the desired amount of hardening or more desired amount of hardening. It should be noted that compositions in this example that produce more hardening than is desired for the immediate process at 100° F. may be needed and used to advantage in processing the same or other films at still higher temperatures where more hardening must be accomplished to maintain the desired amount of swelling during the processing operations.

EXAMPLE 3

Example 1 was repeated using a series of prehardener solutions adjusted to a pH of 4.8 and containing succinaldehyde bis-sodium bisulfite concentrations of 0, 6.25, 12.5, 25, 50 and 100 grams per liter at each of the following formaldehyde concentrations: 0, 4.7, 9.4 and 18.8 grams per liter. The amount of hardening was judged as in the previous example based on the percent swell value. The results showed that additions of 100 grams per liter of succinaldehyde bis-sodium bisulfite actually softened the emulsion in the absence of formaldehyde. Unexpectedly 9.4 grams per liter of formaldehyde together with 6.25 grams per liter of succinaldehyde bis-sodium bisulfite gave ideal hardening while increases in the amount of succinaldehyde bis-sodium bisulfite gave even more hardening than was needed. As mentioned in Example 2, the extra hardening capacity provided by some of the compositions of this example are used to advantage in processing these and other emulsions at temperatures about 100° F. where the additional hardening capacity is needed.

Similarly it can be shown that other compositions according to our invention having formaldehyde in the concentration range of from about 2 to about 56 grams per liter and a bis-bisulfite adduct of succinaldehyde or other dialdehydes of our invention such as glutaraldehyde, the lower alkly glutaraldehydes, the alkyl substituted succinaldehydes, maleic dialdehyde, cyclopentanedicarboxaldehyde, etc., in the concentration range of from about 1 to about 100 grams per liter are used advantageously at pH's of 7 and below in prehardener compositions for photographic processing.

Cyclopentanedicarboxaldehyde is advantageously prepared as described in J.A.C.S., 79, page 2822 (1957). The other dialdehydes of our invention are well known. The bis-bisulfite adducts of our dialdehydes are made by methods well known in the art and need not be discussed further.

The invention has been described in detail with particular reference to preferred embodiments thereof but it will be understood that variations and modifications can be effected within the spirit and scope of the invention as described hereinabove and as defined in the appended claims.

We claim:
1. An aqueous prehardener solution for prehardening gelatino silver halide coated on a photographic element, said solutions having a pH in a range from about 2 to 7 and comprising:
   (1) formaldehyde in the concentration range of from about 2 to about 56 grams per liter of said solution and
   (2) a bis-bisulfite adduct of a dialdehyde in which the aldehyde groups are separated by a linear chain of from 2 to 3 carbon atoms at a concentration of from about 1 to about 100 grams per liter of said solution.

2. An aqueous solution of claim 1 in which the bisbisulfite adduct of a dialdehyde is succinaldehyde bissodium bisulfite.

3. An aqueous solution of claim 1 in which the bisbisulfite adduct of a dialdehyde is α-methylglutaraldehyde bis-sodium bisulfite.

4. An aqueous solution of claim 1 in which the bisbisulfite adduct of a dialdehyde is glutaraldehyde bissodium bisulfite.

5. An aqueous solution of claim 1 in which the bisbisulfite adduct of a dialdehyde is cyclopentanedicarboxaldehyde bis-sodium bisulfite.

6. An aqueous prehardener solution for prehardening gelatino silver halide coated on a photographic element, said solution comprising:
(1) formaldehyde in the concentration range from about 2 to 56 grams per liter,
(2) succinaldehyde bis-sodium bisulfite in the concentration range from about 1 to 100 grams per liter,
(3) an alkali metal sulfate in a concentration range of from about 10 to about 200 grams per liter, and
(4) a buffer to hold the pH in the range from about 2 to 7.

7. A process for prehardening the gelatino silver halide emulsion coated on a photographic element in which the said emulsion is contacted with an aqueous prehardener solution having a pH in the range from about 2 to 7 and comprising:
(1) formaldehyde at a concentration in the range of from about 2 to about 56 grams per liter,
(2) a bis-bisulfite adduct of a dialdehyde in which the aldehyde groups are separated by a linear chain of from 2 to 3 carbon atoms, at a concentration in the range from about 1 to about 100 grams per liter, and
(3) an alkali metal sulfate at a concentration in the range from about 10 to about 200 grams per liter for a sufficient time to preharden the said layer(s).

References Cited
UNITED STATES PATENTS

| | | | |
|---|---|---|---|
| 3,232,761 | 2/1966 | Allen et al. | 96—109 XR |
| 3,232,764 | 2/1966 | Allen et al. | 96—111 |
| 3,294,536 | 12/1966 | Baden et al. | 96—111 XR |

NORMAN G. TORCHIN, *Primary Examiner.*

J. R. EVERETT, *Assistant Examiner.*

U.S. Cl. X.R.

96—111